(12) United States Patent
Butera et al.

(10) Patent No.: US 11,807,512 B2
(45) Date of Patent: Nov. 7, 2023

(54) PROPORTIONAL VALVE

(71) Applicant: DOLPHIN FLUIDICS S.R.L., Corsico (IT)

(72) Inventors: Francesco Butera, Arese (IT); Luca Montella, Milan (IT); Diego Andreis, Milan (IT)

(73) Assignee: DOLPHIN FLUIDICS S.R.L., Corsico (IT)

( * ) Notice: Subject to any disclaimer, the term of this patent is extended or adjusted under 35 U.S.C. 154(b) by 221 days.

(21) Appl. No.: 17/163,859

(22) Filed: Feb. 1, 2021

(65) Prior Publication Data

US 2021/0253414 A1 Aug. 19, 2021

(30) Foreign Application Priority Data

Feb. 13, 2020 (IT) .................. 102020000002908

(51) Int. Cl.
| | |
|---|---|
| *F16K 1/20* | (2006.01) |
| *B67D 1/12* | (2006.01) |
| *F16K 31/02* | (2006.01) |

(52) U.S. Cl.
CPC ......... *B67D 1/1204* (2013.01); *B67D 1/1277* (2013.01); *F16K 1/2007* (2013.01); *F16K 1/2021* (2013.01); *F16K 31/025* (2013.01)

(58) Field of Classification Search
CPC ........ F16K 1/2007; F16K 1/2021; F16K 1/20; F16K 31/025; F16K 31/10; B67D 1/1204; B67D 1/1277; B67D 1/1279
See application file for complete search history.

(56) References Cited

U.S. PATENT DOCUMENTS

| | | |
|---|---|---|
| 9,880,565 B1 * | 1/2018 | Andreis ................ F16K 31/406 |
| 2003/0057393 A1 | 3/2003 | Christoffersen et al. |

(Continued)

FOREIGN PATENT DOCUMENTS

| | | |
|---|---|---|
| EP | 3027096 A1 | 6/2016 |
| WO | WO-02090807 A1 | 11/2002 |

(Continued)

OTHER PUBLICATIONS

Search Report dated Oct. 13, 2020 in Italian Application No. IT 202000002908 (with English translation of categories), 2 pages.

*Primary Examiner* — Kelsey E Cary
(74) *Attorney, Agent, or Firm* — Element IP, PLC

(57) ABSTRACT

The present invention relates to a proportional valve (1), particularly for fluid dispensing devices, comprising a main body (3) in which an inlet conduit (5) for an inlet fluid to said proportional valve (1) and an outlet conduit (7) for a fluid leaving said proportional valve (1) are defined, said inlet conduit (5) and said outlet conduit (7) being in fluid communication with each other, said proportional valve (1) comprising at least one shutter element (9) arranged between said inlet conduit (5) and said outlet conduit (7) adapted to intercept said fluid, said shutter element (9) comprising a movable fluid sealing element (90) adapted to intercept said fluid at one of said inlet conduit (5) and said outlet conduit (7) and a lever element (92) associated at a first end with said movable fluid sealing element (90) and at a second end with an actuator device (11), said lever element (92) being hinged about said main body (3) at a fulcrum point (94) arranged between said first end and said second end of said lever element (92), said actuator device (11) being configured for moving said lever element (92) of said shutter element (9) around said fulcrum point (94) so as to move said movable fluid sealing element (90) between an opening position in which the fluid communication between said inlet conduit (Continued)

(5) and said outlet conduit (7) is allowed and a closing position in which the fluid communication between said inlet conduit (5) and said outlet conduit (7) is prevented. According to the invention, said actuator device (11) comprises an actuator element (13) made of a shape memory material which can be operated progressively to move said lever element (92) of said shutter element (9) around said fulcrum point (94) so as to proportionally vary the degree of opening of said movable fluid sealing element (90) between said opening position and said closing position, and vice versa, the variation of said degree of opening of said movable fluid sealing element (90) allowing the regulation of the flow rate of said fluid exiting from said outlet conduit (7).

16 Claims, 6 Drawing Sheets

(56) References Cited

U.S. PATENT DOCUMENTS

| | | | |
|---|---|---|---|
| 2013/0043421 A1* | 2/2013 | Hong | F16K 1/165 |
| | | | 251/231 |
| 2015/0210417 A1* | 7/2015 | Donati | F16K 5/12 |
| | | | 251/315.1 |
| 2017/0108020 A1* | 4/2017 | Andreis | F15C 1/143 |
| 2019/0017622 A1* | 1/2019 | Leeseberg | F16K 39/028 |
| 2021/0172533 A1* | 6/2021 | Rodgers | F16K 1/2007 |

FOREIGN PATENT DOCUMENTS

| | | |
|---|---|---|
| WO | WO-2005108840 A1 | 11/2005 |
| WO | WO-2015015370 A1 | 2/2015 |
| WO | WO-2015015370 A8 | 2/2015 |

* cited by examiner

PROPORTIONAL VALVE

The present invention relates to a proportional valve, in particular for fluid dispensing devices, such as for example beverages. The present invention also relates to a proportional mixing valve, again for fluid dispensing devices.

As is known, there are various types of fluid dispensing devices. Among them devices for dispensing beverages, such as machines for domestic use or commercial dispensers that are used in bars or restaurants, are certainly known. These devices for dispensing fluids very often also perform mixing of fluids, such as for example water and syrups, in order to prepare different types of beverages.

For the correct operation of the devices for dispensing fluids, in particular beverages, various types of dispensing valves can be used, according to the type of fluid to be dispensed, for example according to the type of beverage to be prepared and/or served. These valves allow the beverages to be dispensed in a controlled manner. For example, it is known to use so-called proportional valves, which allow to vary, and preferably to control, the flow rate of the beverage to be dispensed during delivery.

When the beverage is the result of a mixing of two or more substances, for example water and other ingredients such as syrups, mixing valves are used.

An example of such mixing valves is the so-called "post-mix" valve, which allows the express preparation of a beverage which is obtained by directly mixing water and syrup when the beverage is dispensed.

Devices for dispensing beverages obtained by mixing two or more ingredients often require the use of proportional valves that allow to vary the flow rate of the fluid that passes through them, by means of special commands, in order to obtain the correct degree of mixing as a function of the beverage to be prepared.

The opening of the proportional valve and therefore the flow rate of the fluid that passes through is modulated by special actuators, which can be of the electric, pneumatic or hydraulic type.

The growing demand for such beverage dispensing devices, and their growing diversification also based on the different types of fluid to be dispensed or beverage to be prepared, entails and also requires a continuous technological development of the valves present therein, in order to increase the precision and the control of the parameters for dispensing and mixing the fluids.

Currently, the valves adopted in the aforementioned dispensing and mixing devices have technical drawbacks due to the difficulty of regulating the dispensing of liquids accurately and in real time, in particular when different liquids must be mixed together in specific ratios, even when the ancillary conditions vary.

For example, the use of valves which, for the control of the flow rate of the liquid passing through them, operate by varying the opening and closing frequency of the valve shutter, for example through pulse modulation (PWM—Pulse Width Modulation) of the opening and closing of the valve shutter, is known. This approach allows the flow rate of a fluid to be regulated, however, sudden interruptions in the flow that lead to the so-called "water hammer", will in the long run damage the valve itself, and in particular the fluid sealing of the valve.

Furthermore, proportional valves operating in PWM typically have a limited flow rate. In fact, in order to increase the flow rate of these proportional valves operating in PWM it is necessary to significantly increase the actuation powers, but this makes these valves very noisy, not very reliable and also entails high energy consumption.

The task of the present invention is to provide a proportional valve, particularly for fluid dispensing devices, which solves the technical problems described above, obviates the drawbacks and overcomes the limitations of the known art, allowing to bring in operation and durability improvements to be made with respect to the known valves.

Within the scope of this task, an object of the present invention is to realise a proportional valve which is more efficient and which allows a more accurate control of the dispensing of beverages.

Another object of the invention is to realise a proportional valve which can be controlled in real time without negative repercussions on the dispensing fluidity.

Still another object of the invention is to realise a proportional valve which can be used in a mixing valve capable of allowing an accurate and real-time regulation of the mixing parameters.

Another object of the invention is to realise a proportional valve which is capable of accurately regulating the dispensing of liquids having different viscosities, for example in the range between 0.0001 Pa*s up to 3 Pa*s.

A further object of the invention is to realise a proportional valve which is capable of giving the greatest assurances of reliability and safety in use. Another object of the invention is to realise a proportional valve which is easy to realise and economically competitive if compared to the prior art.

The aforementioned task as well as the aforementioned objects and others which will become more apparent hereinafter, are achieved by a proportional valve as recited in claim 1.

Other features are comprised in the dependent claims.

Further characteristics and advantages will become clearer from the description of some preferred but not exclusive embodiments of a proportional valve, illustrated only by way of non-limiting example with the aid of the accompanying drawings, in which.

Figure 1:
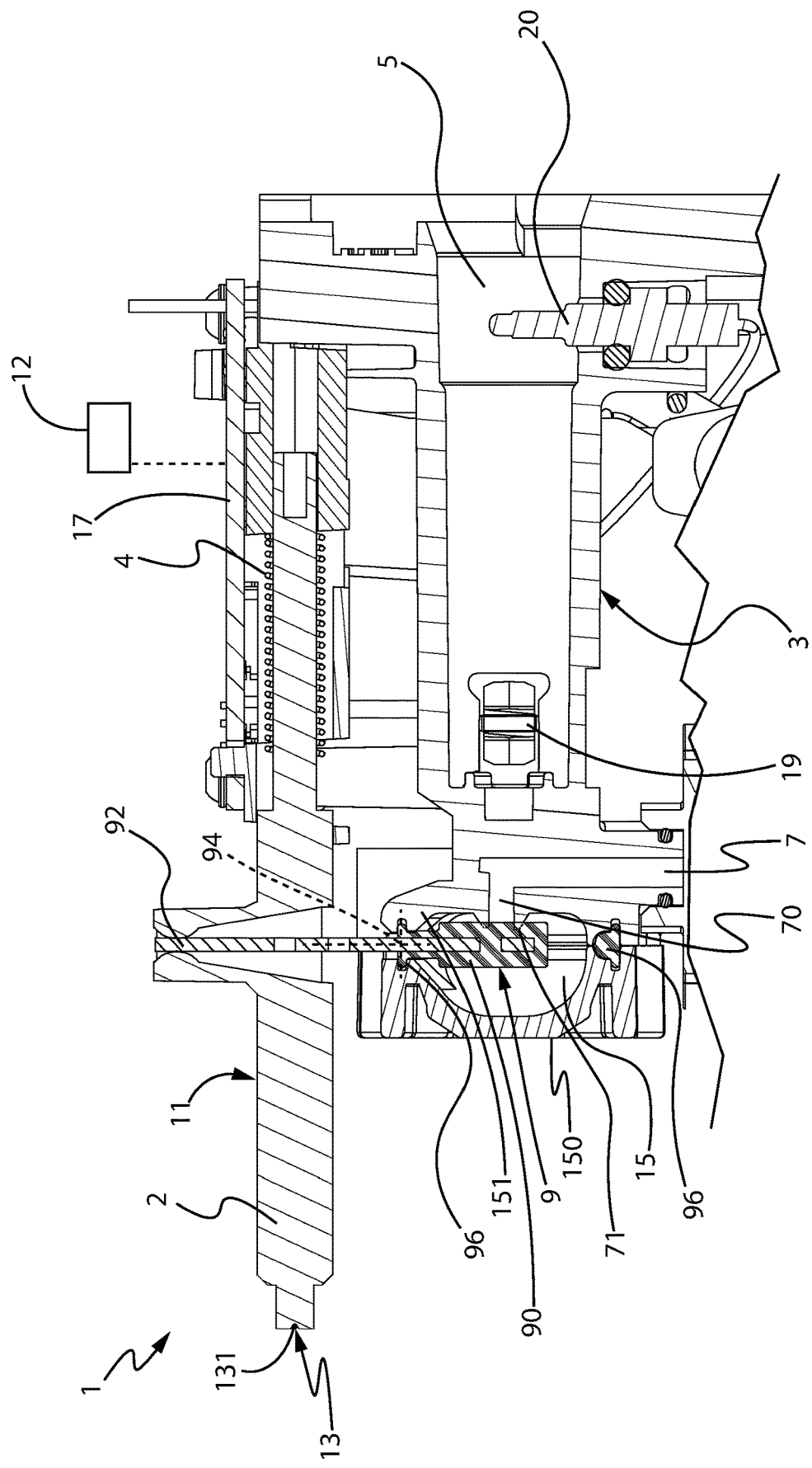
FIG. 1 is a schematic view, in lateral section, of an embodiment of a proportional valve, according to the invention.

With reference to the aforementioned figures, the proportional valve, particularly for fluid dispensing devices, globally indicated by the reference number 1, comprises a main body 3 in which an inlet conduit 5 for an inlet fluid to the proportional valve 1 and an outlet conduit 7 for a fluid leaving the proportional valve 1 are defined. The inlet conduit 5 and the outlet conduit 7 are in fluid communication with each other.

The proportional valve 1 comprises at least one shutter element 9 arranged between the inlet conduit 5 and the outlet conduit 7 adapted to intercept the fluid in the passage from the inlet conduit 5 to the outlet conduit 7.

This shutter element 9 comprises a movable fluid sealing element 90 adapted to intercept the fluid at one of the inlet conduit 5 and the outlet conduit 7 and a lever element 92 associated at a first end with the movable fluid sealing element 90 and at a second end with an actuator device 11. In particular, the lever element 92 is hinged about the main body 3 of the valve 1 at a fulcrum point 94 arranged in an intermediate zone between the first end and the second end of the lever element 92.

The actuator device 11 is configured for moving the lever element 92 of the shutter element 9 around the fulcrum point 94 so as to consequently move the movable fluid sealing element 90 between an opening position in which the fluid communication between the inlet conduit 5 and the outlet conduit 7 is allowed and a closing position in which the fluid communication between the inlet conduit 5 and the outlet conduit 7 is prevented.

In practice, the inclination movement of the lever element 92 around the fulcrum point 94 progressively moves the fluid sealing element 90 away from one of the outlet conduit 7 (as in the example illustrated) or the inlet conduit 5.

According to the invention, the actuator device 11 comprises an actuator element 13 made of a shape memory material (so-called SMA—Shape Memory Alloy) which can be operated progressively to move the lever element 92 of the shutter element 9 around the fulcrum point 94 so as to proportionally vary the degree of opening of the movable fluid sealing element 90 between the opening position and the closing position, and vice versa. The variation of the degree of opening of the movable fluid sealing element 90 therefore allows the regulation of the flow rate of the fluid exiting from the outlet conduit 7.

The fluid is preferably in liquid form, like in the case of water, syrups or beverages, possibly mixed with gas, such as carbon dioxide, like in the case of sparkling water.

Advantageously, the lever element 92 of the shutter element 9 is partially housed inside a chamber 15 formed in the main body 3, between the inlet conduit 5 and the outlet conduit 7. This lever element 92 protrudes outside the chamber 15 at the second end thereof, that is, so that the second end of the lever element 92 on which the actuator element 13 acts is arranged outside the chamber 15. The shutter element 9 also comprises a fixed fluid sealing element 96 adapted to seal between the lever element 92 and the walls of the chamber 15, at least in the zone in which the lever element 92 protrudes outside the chamber 15.

Preferably, the fixed fluid sealing element 96 is made in a single piece with the movable fluid sealing element 90. In this case the movable sealing element 90 advantageously has a disc configuration adapted to be facing the outlet hole 70 of the outlet conduit 7, while the fixed sealing element 96 has an annular ring configuration so that it can be arranged between a pair of shell walls 150, 151 defining the chamber 15 in the main body 3.

The movable sealing element 90 and the fixed sealing element 96 are advantageously both associated with the lever element 92, for example by means of co-molding techniques. In fact, the sealing elements 90 and 96 can be made of rubber or soft polymeric materials and co-molded to a lever element 92 made of metal or rigid polymeric materials.

Advantageously, the actuator device 11 comprises an electric current generating device 12 operatively connected to the actuator element 13 in order to selectively modify shape and/or size thereof through a temperature variation induced by the passage of electric current inside the element actuator 13.

Furthermore, the proportional valve 1 advantageously comprises an electronic control board 17 configured to control the electric and/or electronic components of the valve 1 and in particular to control the electric current generating device 12. This electronic control board 17 is preferably associated with the main body 3, as illustrated in the accompanying figures.

As illustrated in the accompanying figures, the actuator device 11 advantageously comprises a movable piston 2 associated respectively with the actuator element 13 and with the lever element 92 of the shutter element 9. The actuator device 11 also comprises an elastic contrast element 4 adapted to exert a thrust on said piston 2, as explained below.

In the closing position of the shutter element 9, the actuator element 13 made of shape memory material is at rest and the elastic contrast element 4, such as for example a helical spring, exerts a thrust force on the movable piston 2 to keep it in a position such as to keep the shutter element 9 closed on the outlet conduit of the fluid and to thus prevent the fluid communication between the inlet conduit 5 and the outlet conduit 7.

As also explained below, the actuation of the actuator element 13 causes an axial displacement of the movable piston 2 which in turn leads to the rotation of the shutter element 9 around the fulcrum point 94. This axial displacement of the movable piston 2 occurs in contrast to the force exerted by the elastic contrast element 4, which must have an elastic coefficient compatible in use with the forces exerted by the actuator element 13.

Advantageously, the actuator element 13 made of shape memory material is in the form of a wire 131 or of a strip.

In an alternative embodiment not illustrated, the actuator element 13 can assume a spring configuration, for example configured to push or pull the movable piston 2 in a direction opposite to the direction in which the elastic abutment element 4 acts.

Advantageously, the ends 131A of the wire 131 made of shape memory material are constrained to the main body 3, and in particular to a fixed structure 30 integral with this main body 3. The wire 131 made of shape memory material is also advantageously supported, in a movable way—except for the two ends 131A, by this fixed structure 30 inside which the movable piston 2 is also movable. Advantageously, the movable piston 2 comprises a pair of guide elements 30A which guide from above and from below the variations in size of the wire 131.

The wire 131 made of shape memory material passes around the outer end of the movable piston 2, so that any variations in shape and/or size of the wire 131 cause the axial displacement of the movable piston 2 and therefore the opening and/or the closing of the shutter element 9.

In practice, the passage of electric current in the actuator element 13 made of shape memory material, and more particularly along the wire 131 made of shape memory material, leads to the heating of this material by Joule effect. This heating tends to reduce the length of the actuator element 13, and since it is constrained to the main body 3 at the ends thereof, the reduction in length causes an axial thrust of the piston 2 in contrast to the thrust force of the elastic contrast element 4. The piston 2 in its longitudinal movement drags the second end of the lever element 92, with which it is associated, so as to cause the rotation of the shutter element 9 around the fulcrum point 94 and therefore to displace the fluid sealing element 90 in an opening position.

Advantageously, the extent of variation in the shape and/or size of the actuator element 13 and consequently the degree of opening of the movable fluid sealing element 90 is a function of the temperature variation of the actuator element 13 and ultimately of the variation of the electric current that passes through said actuator element 13.

Advantageously, the proportional valve 1 comprises detecting means for detecting a quantity related to the degree of opening of the movable sealing element 90 of the shutter element 9.

Said detecting means for detecting a quantity related to the degree of opening of the movable sealing element 90 may comprise position sensors adapted to detect the opening position of the movable sealing element 90 with respect to its closing position, or angular sensors adapted to detect the degree of rotation of the lever element 92 around the fulcrum point 94.

Preferably, the detecting means for detecting a quantity related to the degree of opening of the movable fluid sealing element 90 comprise means for detecting the electrical resistivity value of the actuator element 13 made of a shape memory material.

In particular, the opening position of the movable sealing element 90 with respect to the closing position thereof can be detected indirectly, without using dedicated sensors, by measuring the electrical resistance of the actuator element 13 made of shape memory material, from which it is possible to derive the length thereof and from the latter the position of the movable piston 2 and consequently, through suitable calibrations, the degree of opening of the movable fluid sealing element 90.

In a further advantageous embodiment, the position of the movable piston 2 with respect to the main body 3 can be detected, for example by means of optical, capacitive, induction, resistive sensors, etc., and from it the degree of opening of the movable fluid seal 90.

Advantageously, the electronic control board 17 is configured to receive as an input a signal representative of the degree of opening of the movable fluid sealing element 90 with respect to the closing position, as described above, and to control accordingly, preferably on the basis of a closed-loop control, the electric current generating device 12 operatively connected to the actuator element 13 in order to generate, by regulating the generated electric current, a variation in shape and/or size of the same which leads to a determined inclination of the lever element 92 around the fulcrum point 94 and therefore a desired degree of opening of the movable sealing element 90.

In this way it is possible to vary and accurately control the flow rate of the fluid that passes from the inlet conduit 5 to the outlet conduit 7, during the operation of the proportional valve 1.

Advantageously, the electronic control board 17 comprises a wireless remote communication module, not illustrated, adapted to allow it to communicate and/or to be controlled and/or programmed and/or monitored from outside the proportional valve 1, through an electronic device such as, for example, a computer, a smartphone, a tablet, a PLC, an additional electronic board (for example the electronic control board of a machine for producing and dispensing beverages, in which the valve 1 is fitted), etc.

Furthermore, the proportional valve 1 can advantageously comprise a flow sensor 19, adapted to measure the flow rate of the fluid flowing between the inlet conduit 5 and the outlet conduit 7.

This flow sensor 19 can be placed at the inlet conduit 5 so as to measure the flow rate of the incoming flow, alternatively the flow sensor 19 can be positioned at the outlet conduit 7 so as to measure the flow rate exiting from the proportional valve 1.

Advantageously, the electronic board 17 is configured to receive as an input a signal relating to the flow rate of the flow passing through the proportional valve 1 and consequently to control, preferably on the basis of a closed-loop control, the electric current generating device 12 operatively connected to the actuator element 13 in order to generate, by regulating the generated current, a variation in shape and/or size thereof, corresponding to the inclination of the lever element 92 around the fulcrum point 94 and therefore corresponding to the degree of opening of the movable sealing element 90, and ultimately corresponding to the fluid flow rate to be obtained.

Advantageously, the proportional valve 1 can also comprise a temperature sensor 20, in contact with the fluid, also in data communication with the electronic board 17.

Figure 4:
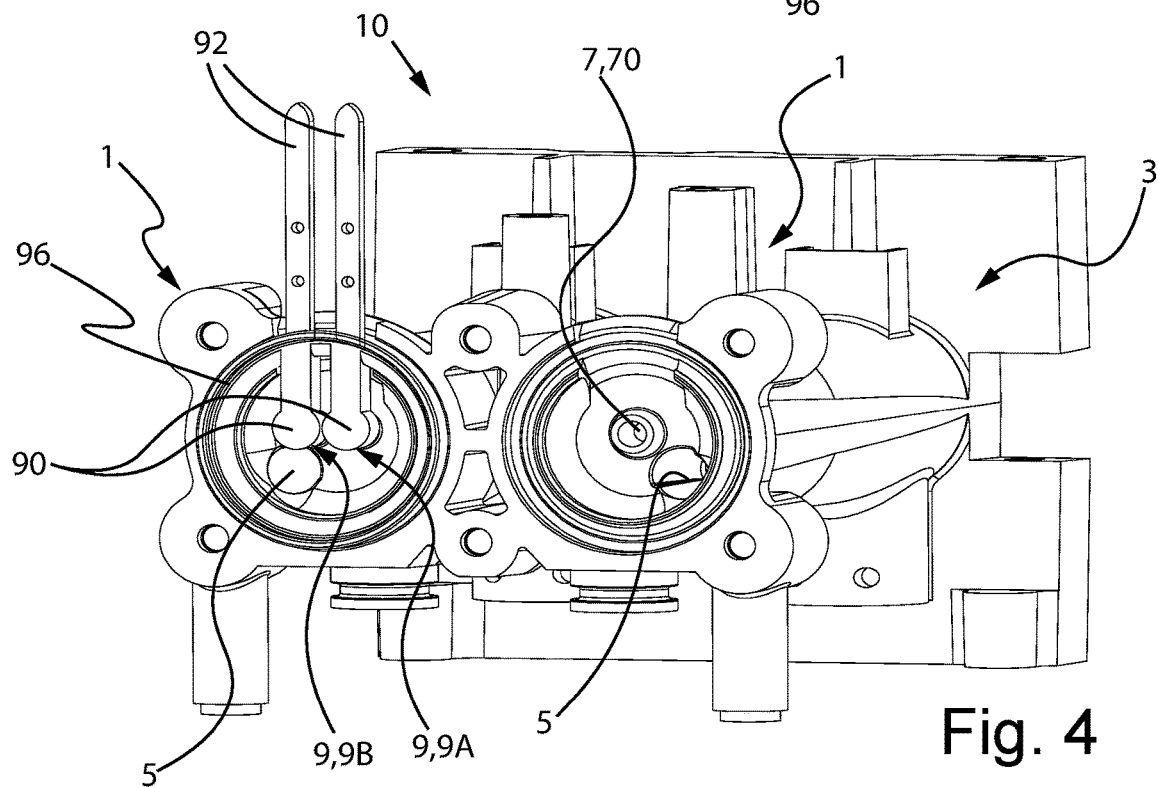
FIG. 4 is a perspective view of a second embodiment of a proportional mixing valve, according to the invention, with some components removed.
Figure 5:
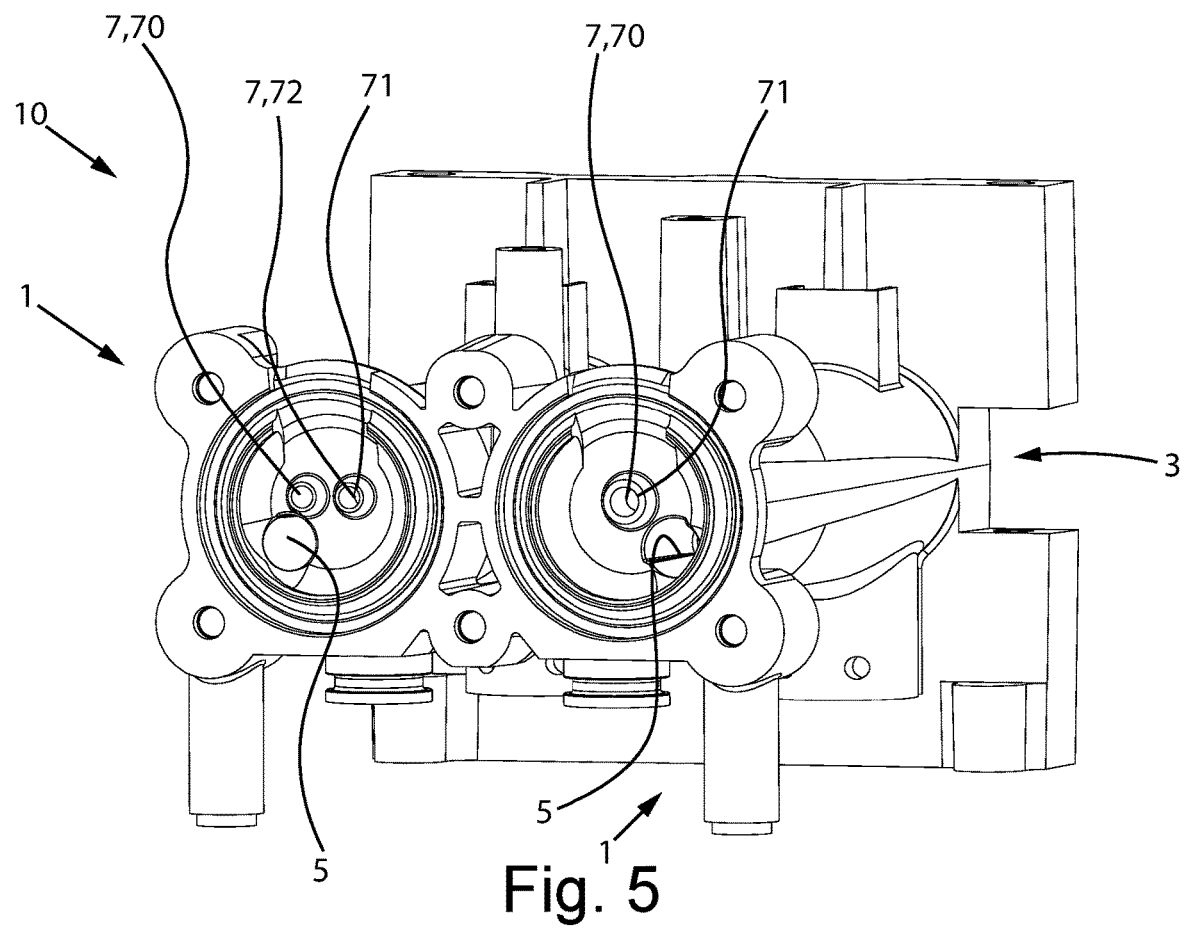
FIG. 5 illustrates the proportional mixing valve of FIG. 4, in which the actuator elements have been removed.
Figure 6:
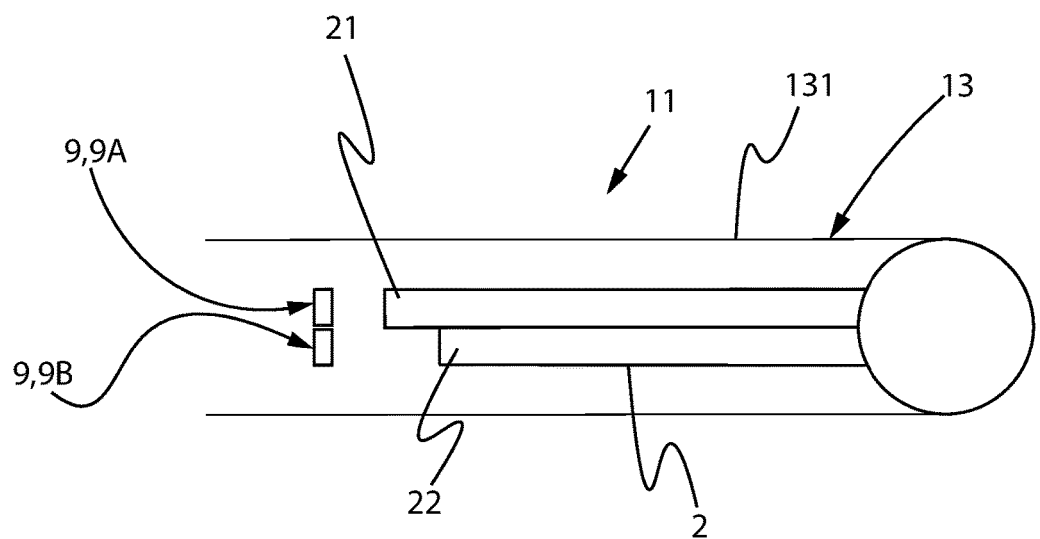
FIG. 6 is a schematic view of an actuator device of the proportional mixing valve of FIG. 4.

Advantageously, as illustrated in particular in FIGS. 4, 5 and 6, the proportional valve 1 comprises two or more shutter elements 9, since the outlet conduit (or, in an embodiment not illustrated, the inlet conduit 5, in the case in which the shutter element 9 acts on the inlet conduit 5) comprises two or more outlet (or inlet) holes 70, 72, wherein each movable fluid sealing element 90 of the two or more shutter elements 9 is adapted to intercept the fluid in correspondence with the two or more outlet holes 70, 72 respectively. Furthermore, each of the two or more shutter elements 9 is movable selectively to vary the degree of opening of each movable fluid sealing element 90 with respect to the respective outlet hole 70, 72.

Advantageously, the proportional valve 1 can comprise two or more distinct actuator devices 11, each configured to operate, i.e. to open and close, a respective shutter element 9. In this way it is possible to proportionally vary the degree of opening of a single shutter element 9, keeping the other completely open, or completely closed, so as to be able to partialize the operation of the proportional valve 1. It is also possible to vary the degree of opening of each of the two or more shutter elements 9 simultaneously but independently.

Alternatively, as illustrated in the diagram of FIG. 6, a single actuator device 11 can be provided which controls in a differentiated manner, for example sequentially, the two or more shutter elements 9 with which the proportional valve 1 is provided.

In this case a single movable piston 2 is advantageously connected to both shutter elements 9, and specifically to both lever elements 92, but in a staggered manner. In this way the axial movement of the movable piston 2 leads to the sequential opening of the two shutter elements 9, whereas the opening of each of the two shutter elements 9 always takes place in a proportional manner.

With reference to the diagram of FIG. 6, therefore, a first portion 21 of the movable piston 2, staggered with respect to a second portion 22 thereof, opens, in a proportional way, a first shutter element 9A, while the opening of a second shutter element 9B, again in a proportional manner, occurs only when also the second portion 22 engages the second shutter element 9B. Such a configuration of the movable piston 2 therefore allows the two shutter elements 9A, 9B to be opened one after the other.

As already mentioned, the same configuration could be applied at the inlet conduit 5, in the case in which the shutter elements 9 are adapted to intercept the fluid at two or more inlet holes 50, respectively.

Advantageously, the outlet conduit 7 of the proportional valve 1 comprises at least one outlet hole 74, 76 whose section has an asymmetrical shape with respect to the longitudinal axis of development of the lever element 92.

The selection of a particular asymmetrical shape of the section of the outlet hole 74, 76 advantageously allows to select different outlet curves of the fluid, in terms of flow rate, as the degree of opening of the movable fluid sealing element 90 varies.

Preferably, the section of the outlet hole 74, 76 has a shape which, along the longitudinal axis of development of the lever element 92, narrows away from the fulcrum point 94.

The narrowing of the section of the hole 74, 76 allows the port of the fluid outlet to be varied more accurately as a function of the degree of opening of the shutter element 9, thus defining desired profiles of the outlet curves of the fluid.

Advantageously, the section of the outlet hole 74, 76 can have a substantially triangular shape.

Figure 7:
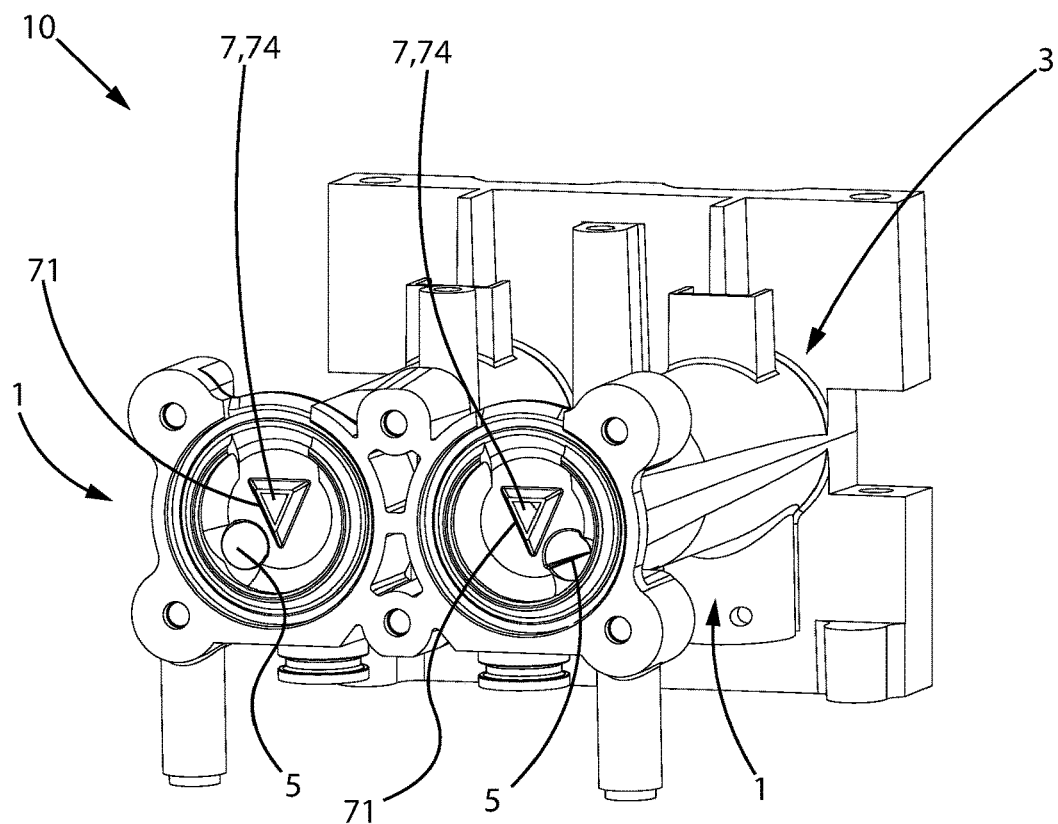
FIGS. 7 to 9 illustrate, in perspective view, three different variants of a proportional mixing valve, according to the invention, with some components removed.
Figure 8:
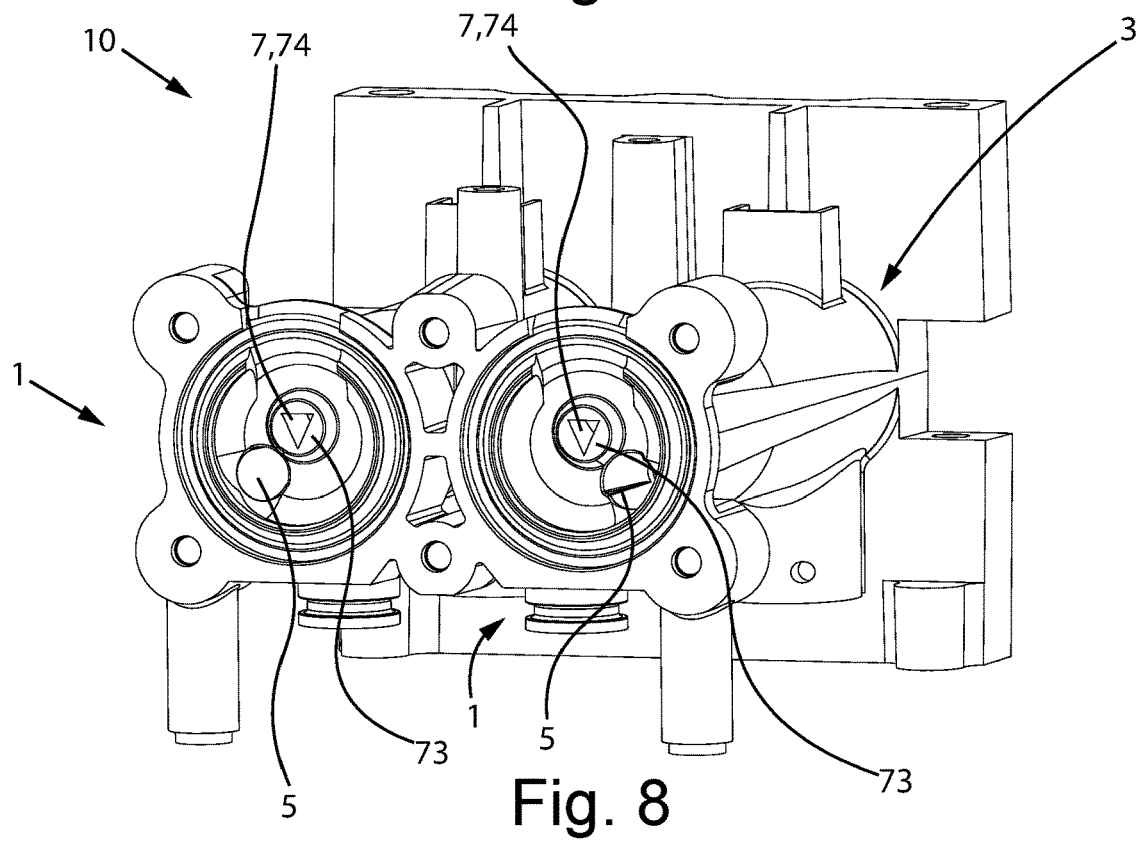

For example, as illustrated in FIGS. 7 and 8, the section of the outlet hole 74 can have a triangular shape, with the base closer to the fulcrum point 94 and the vertex farther away.

Figure 9:
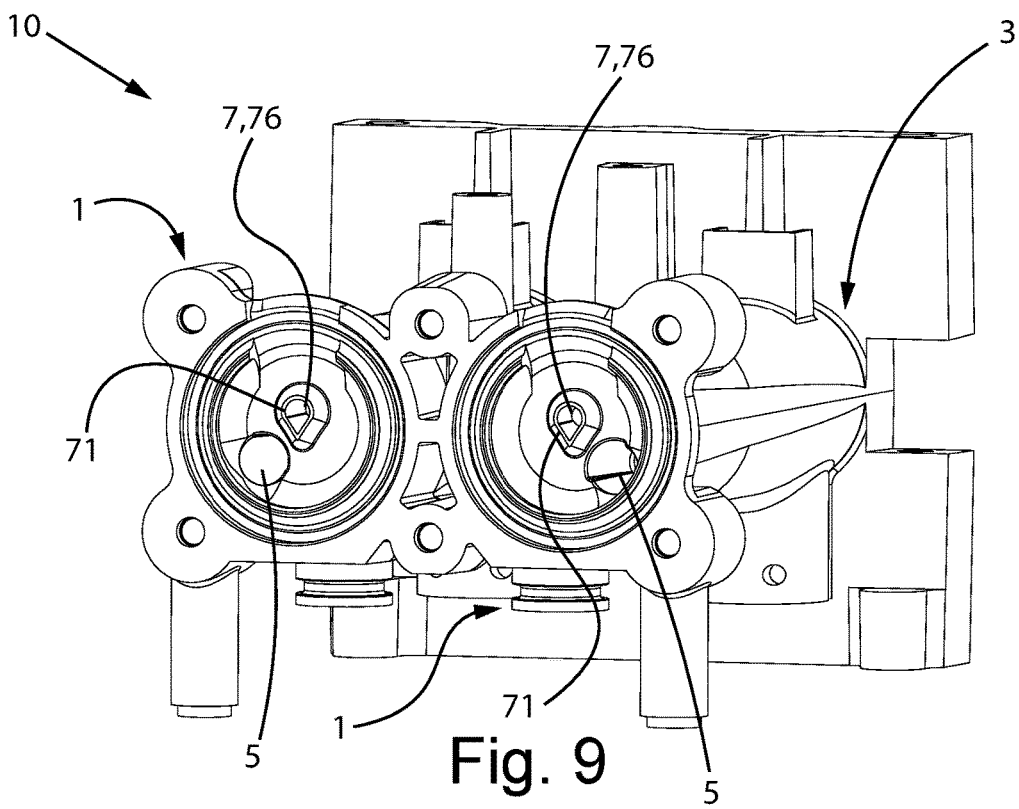

Alternatively, as illustrated in FIG. 9, the section of the outlet hole 76 can have a substantially triangular teardrop shape, that is, with a semi-circular base closer to the fulcrum point 94 and the vertex farther away.

Figure 2:
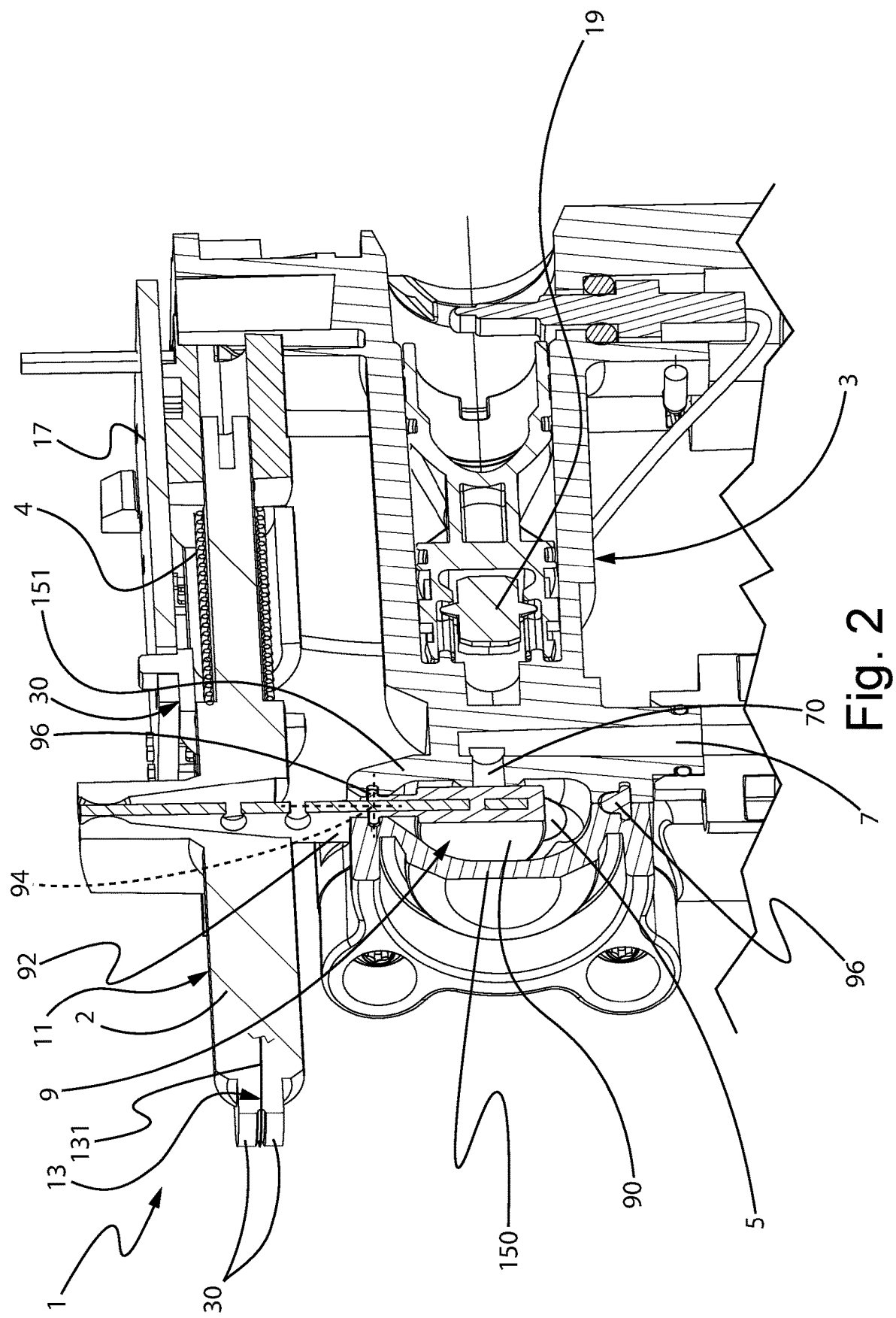
FIG. 2 is a perspective view, in section, of a part of the proportional valve of FIG. 1.
Figure 3:
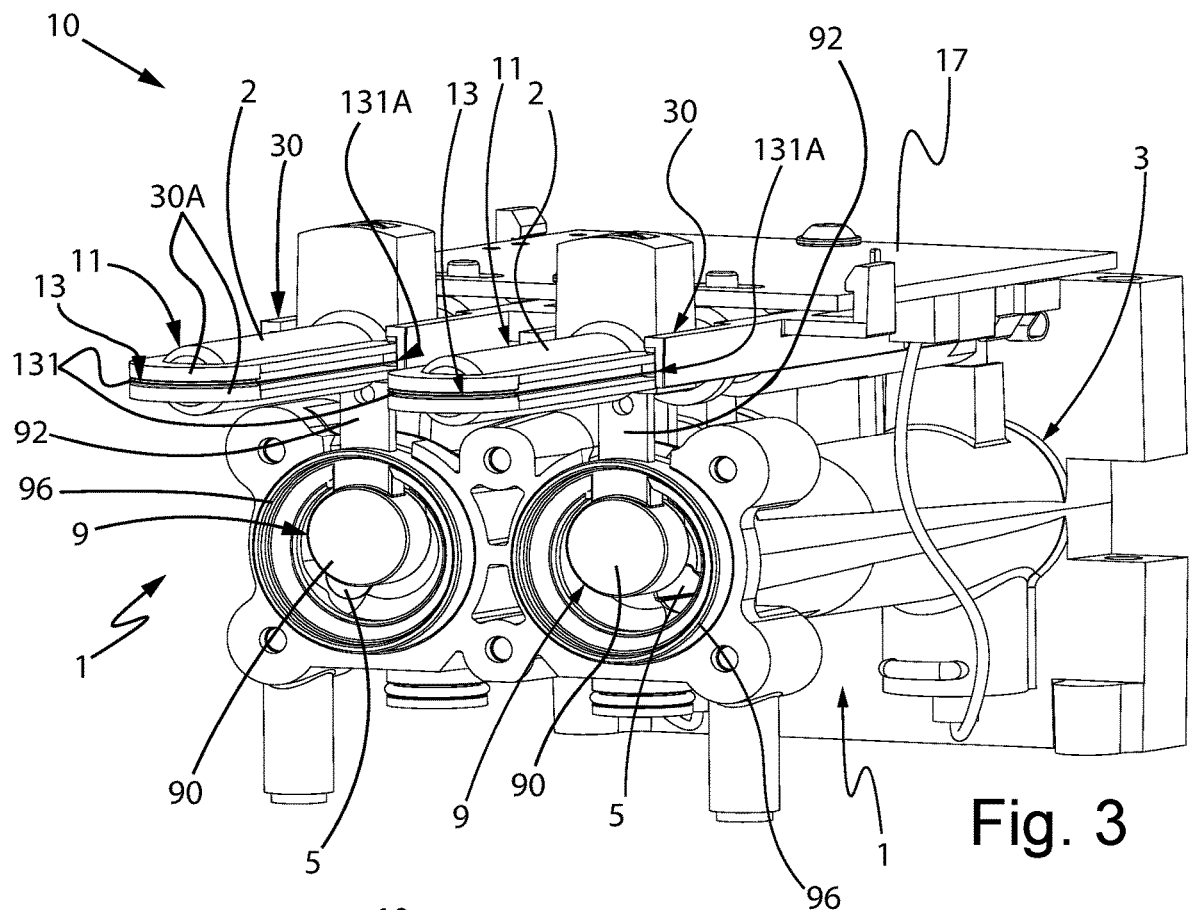
FIG. 3 is a perspective view of a first embodiment of a proportional mixing valve, comprising a pair of proportional valves, according to the invention.

As illustrated in FIGS. 8 and 9, as well as in FIG. 2, the outlet hole 74, 76 can have a protruding, or raised, edge 71 having the same shape as the section of the hole 74, 76 and configured to seal with a movable fluid sealing element 90 defined by a disc with a flat surface.

In this case, therefore, the fluid sealing is provided by the protruding edge 71 resting with the flat surface of the disc of the movable fluid sealing element 90.

Alternatively, as illustrated in FIG. 8, the outlet hole 74, having the desired shape of its section, can be formed in a protruding circular portion 73 of the outlet conduit 7. In this case the movable fluid sealing element 90 is defined by a disc which has, on the face that is facing the hole 74, a protruding projection of a shape coinciding with that of the shape of the section of the hole 74. The fluid sealing is therefore conferred by the contact between the two flat parts respectively of the protruding circular portion 73 of the outlet conduit 7 and of the sealing disc 90.

The conformation of the outlet holes described above can also characterize the inlet holes if the shutter element 9 engages with them rather than with the outlet holes.

Figure 10:
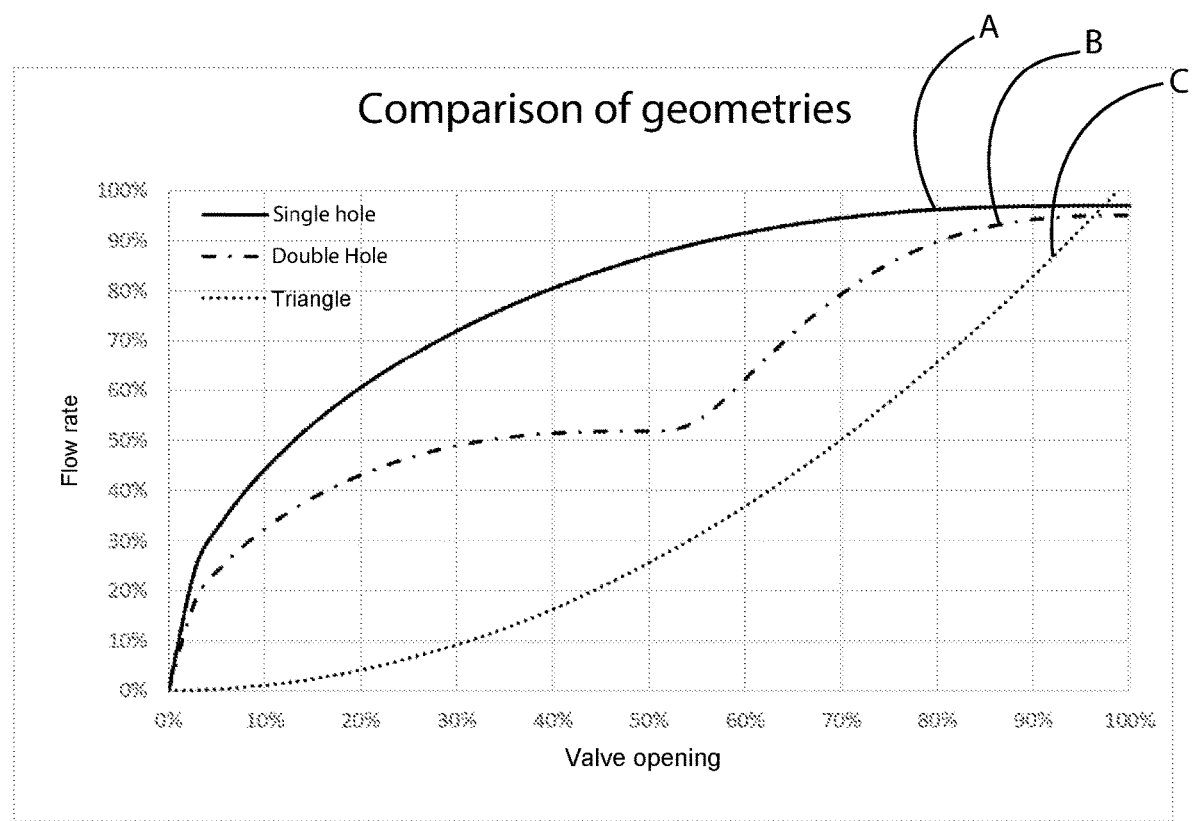
FIG. 10 is a graph which compares three different trends in the flow rate at the outlet from a proportional valve according to the invention, as a function of the opening of the valve itself, as the geometry of the outlet hole varies.

FIG. 10 shows a graph which illustrates the trend of the flow rate at the outlet from the proportional valve 1 as a function of the degree of opening of the shutter element 9 of the proportional valve 1 itself as the geometry of the outlet hole varies.

The degree of opening of the valve 1, indicated on the abscissa, ranges from 0% (i.e. the shutter completely closed) to 100% (i.e. the shutter completely open). The flow rate at the outlet, indicated on the ordinate, ranges from 0% (i.e. no flow) to 100% (i.e. maximum flow that the valve 1 is able to dispense).

The curve indicated with A refers to the flow rate trend in the case of a single outlet hole with circular section, such as the hole 70 illustrated in the left valve of FIG. 5. As can be seen, the trend of curve A is very steep for opening values of the valve lower than 100. Therefore, when it is desired to dispense flow rates lower than 30% of the maximum flow rate, the flow dispensing is excessively sensitive to the degree of opening of the shutter element 9, which makes the operation of the valve 1 very imprecise at these rates.

The curve indicated by C instead refers to the flow rate trend in the case of a single outlet hole with a substantially triangular section, like in the case of the holes 74 or 76 of the valves shown in FIGS. 7, 8 and 9.

In this case, first of all it can be noted that, with respect to the curve relating to a hole with circular section, the curve approximates an almost linear proportionality ratio between the opening of the valve and outlet flow rate. The flow rate dispensing is in fact distributed much more uniformly over the whole opening range of the valve 1. Furthermore, the valve 1 in this case is also very accurate in dispensing flow at low flow rates. In fact, at low flow rates, the curve C has a significantly lower derivative than the curve A.

A single outlet hole with teardrop section has a flow rate trend comparable to that illustrated with reference to the curve C.

FIG. 10 also illustrates the flow rate trend in the case of a double outlet hole with circular section with sequential opening, as in the case of the holes 70 and 72 of the left valve 1 of FIGS. 4 and 5. In this case the trend of the curve, indicated by B, shows two distinguishable behaviours respectively between 0% and 50% of the degree of opening, when a shutter element 9A is being opened proportionally and the other shutter element 9B is completely closed and between 50% and 100% when a shutter element 9A is completely open and the other shutter element 9B is being opened proportionally.

Advantageously, therefore, the selection of a particular geometry of the section of the outlet hole allows to obtain a desired flow rate curve of the outlet flow.

A proportional mixing valve 10 also forms part of the present invention which comprises at least two valves in which the fluids leaving said at least two valves are mixed together, wherein at least one of said two valves is a proportional valve 1 as described above.

Preferably at least two valves of the mixing valve 10 are proportional valves 1 as described above.

Advantageously, the possibility of intervening accurately and in real time on the regulation of the flow rate of at least one of the two or more valves that make up the mixing valve 10 allows to control the dispensing of at least one of the ingredients of a beverage. This allows to control accurately and in real time the proportions of the ingredients that form such a beverage in order to obtain an always optimal product.

An example of the operation of the proportional valve according to the present invention is described below.

Under normal or rest conditions, the proportional valve 1 is normally closed that is the shutter element obstructs the passage of the fluid from the inlet conduit 5 to the outlet conduit 7. This closing configuration of the proportional valve 1 is illustrated in FIGS. 1 and 2. In said rest conditions the elastic contrast element 4 keeps the movable piston 2 in a position such as to keep the shutter element 9 in the closing position on the outlet conduit 7.

The passage of the shutter element 9 of the proportional valve 1 to an open position occurs thanks to the axial movement of the movable piston 2, which is operated by the actuator element 13, in turn operated by means of the electric current generator 12.

The variation of the electric current value that passes through the actuator element 13 leads to a heating and therefore to a variation in proportional shape and/or size of the actuator element 13 and consequently to a progressive and proportional opening of the shutter element 9.

The delivery of electric current through the actuator element 13, and therefore ultimately the degree of opening of the fluid sealing element 90, can be controlled as a function of different operating parameters of the proportional valve 1, such as for example the flow rate of the fluid, measured by means of the flow sensor 19, or also of other parameters obtained preferably by means of sensors connected to the electronic control board 17.

The operation of a proportional mixing valve 10 is also described below, with reference to the operation of the proportional valve 1 described above. By way of example, the operation of a proportional mixing valve 10 comprising two proportional valves 1, such as the one illustrated in the accompanying figures, is described, but this does not exclude the possibility of combining a greater number of proportional valves 1 depending on the number of fluids to be mixed.

For example, in the case of a proportional mixing valve 10 used for dispensing beverages obtained by mixing water and syrups, a first proportional valve 1 is in fluid communication, through its inlet conduit 5, to a source of still or sparkling water while a second proportional valve 1 is in fluid communication, through its inlet conduit 5, to a source of syrup.

The beverage is prepared by mixing water and syrup in desired proportions, thanks to the possibility of being able to regulate the degree of opening of both proportional valves 1 present in the mixing valve 10.

The flow rate of the fluid that passes through each proportional valve 1 will be selected and set based on the beverage recipe, for example by choosing the desired proportion of syrup and water, manually or through pre-set recipes in the electronic control board 17.

The electronic control board 17 can regulate the flow rate of water and/or syrup both on the basis of pre-set parameters and on the basis of values detected by the sensors present in the proportional valve 1, such as for example flow sensors 19 or temperature sensors 20. In fact, it should be noted that the density of the syrups can vary as a function of their temperature and along with it also of the viscosity of the syrups. It is also possible to set predefined dispensing durations during which the shutter element 9 must remain more or less open.

Another application of the proportional mixing valve 10 can relate to water mixers, and therefore the possibility of mixing desired proportions of cold water and hot water in order to obtain warm water dispensed at a desired temperature.

Also in this case, the detection of the temperature of hot and/or cold water before mixing, or preferably of the already mixed water, allows to control the mixing of hot and cold water so as to ensure that desired temperatures of water are reached and maintained.

A further example of application of a proportional mixing valve provided with one, or preferably two, proportional valve(s) as described above is that of dispensing carbonated water whose carbonation level can be accurately controlled by mixing, in real time, still water and sparkling water.

In practice it has been found that the proportional valve, according to the present invention, fulfils the intended task and objects since it allows the flow rate of the fluid leaving the valve to be regulated accurately and in real time.

In particular, an advantage of using a shape memory material for the realisation of the actuator element consists in the fact that the deformation thereof is not impulsive and is instead relatively slow over time. Consequently, also the opening and the closing of the shutter element can be obtained in a gradual and non-impulsive manner, thus allowing to prevent the so-called water hammers that afflict the proportional valves of known type and drastically reduce their durability.

Another advantage of the proportional valve according to the invention consists in being able to select a desired flow curve of the exiting fluid, for example by selecting suitable geometries of outlet holes.

Still another advantage of the proportional valve, according to the invention, consists in the possibility of dispensing the exiting flow in a linear manner with respect to the degree of opening of the valve.

Still another advantage of the proportional valve according to the invention consists in the fact that it has very wide operating ranges, since a same proportional valve can dispense liquids with various viscosities in real time and with the same high degree of accuracy, without making structural changes to the valve.

A further advantage of the proportional valve according to the invention consists in being able to form a proportional mixing valve leading to the same advantages mentioned above.

A proportional mixing valve comprising one or preferably two proportional valves according to the invention allows to mix liquids with different viscosities in real time and with high accuracy. This is of particular interest in the sector of the express dispensing of beverages obtained starting from sugary syrups or so-called "diet" syrups, i.e. without sugars, which have significantly higher viscosities than those of the water with which they are mixed. The wide operating ranges of the proportional valve, according to the invention, allow to operate on liquids with very different physical properties in an equally accurate manner.

The proportional valve thus conceived is susceptible to several modifications and variations, all falling within the scope of the inventive concept.

Furthermore, all the details can be replaced by other technically equivalent elements.

In practice, any materials can be used according to requirements, as long as they are compatible with the specific use, the dimensions and the contingent shapes.

The invention claimed is:

1. A proportional valve for a fluid dispensing device, comprising a main body in which an inlet conduit for an inlet fluid entering said proportional valve and an outlet conduit for a fluid leaving said proportional valve are defined, said inlet conduit and said outlet conduit being in fluid communication with each other, said proportional valve comprising at least one two or more shutter element elements arranged between said inlet conduit and said outlet conduit adapted to intercept said fluid, said outlet conduit comprising two or more outlet holes, said two or more shutter element elements each comprising a movable fluid sealing element adapted to intercept said fluid at one of said inlet conduit and said outlet conduit in correspondence with said two or more outlet holes respectively, and said two or more shutter elements each comprising a lever element associated at a first end with said movable fluid sealing element and at a second end with an actuator device, said lever element being hinged about said main body at a fulcrum point arranged between said first end and said second end of said lever element, said actuator device being configured for moving said lever element of said shutter element around said fulcrum point so as to move said movable fluid sealing element between an opening position in which the fluid communication between said inlet conduit and said outlet conduit is allowed and a closing position in which the fluid communication between said inlet conduit and said outlet conduit is prevented, each of said two or more shutter elements being movable selectively to vary the degree of opening of each movable fluid sealing element with respect to the respective outlet hole, wherein said actuator device comprises an actuator element made of a shape memory material which can be operated progressively to move said lever element of said shutter element around said fulcrum point so as to proportionally vary the degree of opening of said movable fluid sealing element between said opening position and said closing position, and vice versa, the variation of said degree of opening of said movable fluid sealing element allowing the regulation of the flow rate of said fluid exiting from said outlet conduit.

2. The proportional valve according to claim 1, wherein said lever element of said shutter element is partially housed inside a chamber formed in said main body between said inlet conduit and said outlet conduit, said lever element protruding outside said chamber at said second end, said shutter element further comprising a fixed fluid sealing element adapted to seal said lever element between the walls of said chamber.

3. The proportional valve according to claim 2, wherein said fixed fluid sealing element is made in a single piece with said movable fluid sealing element.

4. The proportional valve according to claim 1, wherein said actuator device comprises an electric current generating device operatively connected to said actuator element in order to selectively modify the shape and/or the size of said actuator element through a temperature variation induced by the passage of electric current inside said actuator element.

5. The proportional valve according to claim 4, further comprising an electronic control board configured to control said electric current generator device.

6. The proportional valve according to claim 1, further comprising detecting means for detecting a quantity related to said degree of opening of said movable fluid sealing element of said shutter element.

7. The proportional valve according to claim 6, wherein said detecting means for detecting a quantity related to said degree of opening of said movable fluid sealing element of said shutter element comprise means for detecting the electrical resistivity value of said actuator element made of a shape memory material.

8. The proportional valve according to claim 1, wherein said actuator device comprises a movable piston associated respectively with said actuator element and with said lever element of said shutter element, said actuator device further comprising an elastic contrast element adapted to exert a thrust on said movable piston.

9. The proportional valve according to claim 1, comprising two or more of said actuator devices each adapted to operating a corresponding shutter element of said two or more shutter elements.

10. The proportional valve according to claim 1, comprising a single actuator device adapted to operate in a differentiated manner said two or more shutter elements.

11. The proportional valve according to claim 1, wherein said actuator device comprises a movable piston comprising a first portion staggered with respect to a second portion of said movable piston, said first portion being configured to open and close a first shutter element of said two or more shutter elements, said second portion being configured to open and close a second shutter element of said two or more shutter elements.

12. The proportional valve according to claim 1, wherein at least one outlet hole of said two or more outlet holes has an asymmetrical shape with respect to the longitudinal axis of development of said lever element.

13. The proportional valve according to claim 12, wherein the section of said outlet hole has a shape which, along said longitudinal axis of development of said lever element, narrows away from said fulcrum point.

14. The proportional valve according to claim 12, wherein the section of said outlet hole is substantially triangular.

15. A proportional mixing valve comprising at least two valves, configured such that fluids leaving said at least two valves are mixed together, wherein at least one of said at least two valves is the proportional valve according to claim 1.

16. A proportional valve for a fluid dispensing device, comprising a main body in which an inlet conduit for an inlet fluid entering said proportional valve and an outlet conduit for a fluid leaving said proportional valve are defined, said inlet conduit and said outlet conduit being in fluid communication with each other, said proportional valve comprising at least one two or more shutter element elements arranged between said inlet conduit and said outlet conduit adapted to intercept said fluid, said outlet conduit comprising two or more outlet holes, said two or more shutter element elements each comprising a movable fluid sealing element adapted to intercept said fluid at one of said inlet conduit and said outlet conduit in correspondence with said two or more outlet holes respectively, and said two or more shutter elements each comprising a lever element associated at a first end with said movable fluid sealing element and at a second end with an actuator device, said lever element being hinged about said main body at a fulcrum point arranged between said first end and said second end of said lever element, said actuator device being configured for moving said lever element of said shutter element around said fulcrum point so as to move said movable fluid sealing element between an opening position in which the fluid communication between said inlet conduit and said outlet conduit is allowed and a closing position in which the fluid communication between said inlet conduit and said outlet conduit is prevented, each of said two or more shutter elements being movable selectively to vary the degree of opening of each movable fluid sealing element with respect to the respective outlet hole, wherein said actuator device comprises an actuator element made of a shape memory material which can be operated progressively to move said lever element of said shutter element around said fulcrum point so as to proportionally vary the degree of opening of said movable fluid sealing element between said opening position and said closing position, and vice versa, the variation of said degree of opening of said movable fluid sealing element allowing the regulation of the flow rate of said fluid exiting from said outlet conduit, and wherein at least one outlet hole of said two or more outlet holes has an asymmetrical shape with respect to the longitudinal axis of development of said lever element.

\* \* \* \* \*